(Model.)
C. A. SMITH.
METAL RULER.
No. 287,480. Patented Oct. 30, 1883.
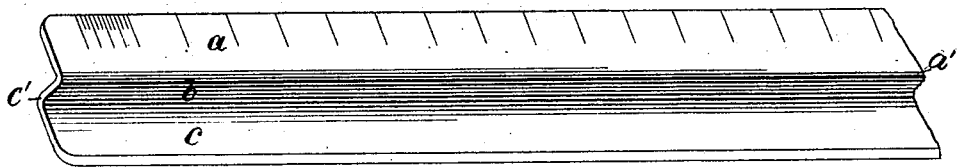
 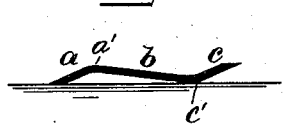 
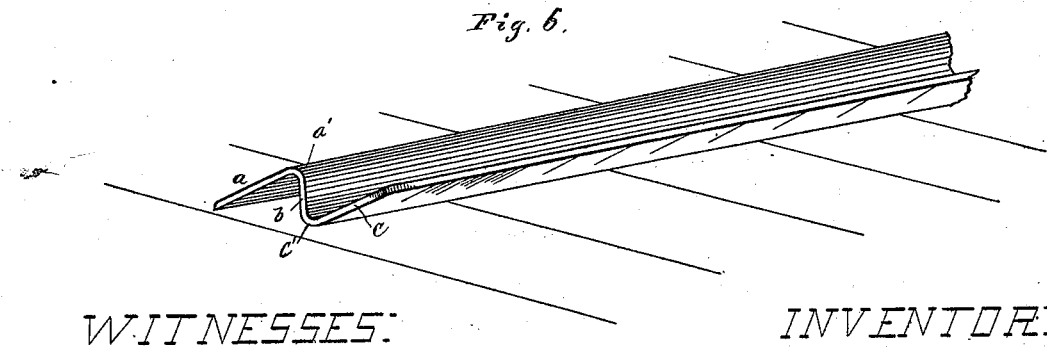
WITNESSES:
Henry J. Miller
Chas. F. Schmitz
INVENTOR:
Charles A. Smith
by Joseph A. Miller & Co
Att'ys

UNITED STATES PATENT OFFICE.

CHARLES A. SMITH, OF PROVIDENCE, RHODE ISLAND.

METAL RULER.

SPECIFICATION forming part of Letters Patent No. 287,480, dated October 30, 1883.

Application filed May 31, 1882. (Model.)

*To all whom it may concern:*

Be it known that I, CHARLES A. SMITH, of the city and county of Providence, and State of Rhode Island, have invented a new and useful Improvement in Rules; and I hereby declare that the following is a full, clear, and exact description of the same, reference being had to the accompanying drawings, forming part of this specification.

This invention has reference to an improvement in sheet-metal scales, used for drafting and measuring.

It consists in crimping the strip of metal so that one inclined surface is formed which ends in an edge placed at an angle when it rests on the paper or on the work, and thus brings the lines of the scale onto the surface to be measured, while another surface is raised in an upward direction and forms a convenient surface for holding and moving the scale, as will be more fully set forth hereinafter.

Figure 1 is a perspective view of my improved bent sheet-metal rule. Fig. 2 is a sectional view of the same. Fig. 3 is a sectional view showing one modification of my improved rule. Fig. 4 is a sectional view showing another modification; and Fig. 5 is a sectional view showing the metal bent to form curved surfaces. Fig. 6 is a view in perspective, showing the position of the rule with relation to its supporting-surface.

In the drawings, $a$ is the surface on which the scale is marked. Any division desired can be so marked on this surface. $b$ is the central portion of the rule, bent at any desired angle with the surface $a$, and connecting the same with the surface $c$, bent in a direction opposite to the bend of the surface $a$. Both the surfaces $a$ and $c$ may have scales marked on them, or one only may be marked. I prefer to mark them both, as the rule is then more convenient in use, as, no matter how the rule is thrown or placed upon the table or other surface, a beveled edge will always be in contact with said table, and a scale always presented to view and lying close to the surface of the table, and the opposite edge of the rule will be elevated above the surface of the table and form a convenient handle for holding and moving the scale or rule, and whichever of the two edges is used the scale will be at an angle to the surface on which it is used most favorable to the light; and as the edge is beveled or made nearly sharp, the lines can extend to the edge and to the surface on which the measurement is to be made.

By this construction the graduations can be marked on the flat sheet of metal, and the same can be bent, as shown in drawings at $a'$ $c'$, by passing the same between rollers having the desired form; or the sheet can be bent in the ordinary sheet-metal-bending machines.

The main feature in my improved rule is that the two opposite edges of each edge of the strip will stand at an angle to the central portion thereof, the bends or angles being so arranged with relation to the width of the strip or rule that when said rule is placed upon a table or other object that portion having the scale exposed—say between $a$ and $c'$—will overbalance the other portion—between $c'$ and $c$—so that a sharp scaled edge will rest upon the table and the opposite edge will be raised above it, and form a convenient handle for holding and moving the rule.

In Fig. 2 the two sides $a$ and $c$ are bent at or nearly at right angles with the central portion, $b$. In Fig. 3 they are bent at an angle much more than a right angle, forming obtuse angles at the intersection; and in Fig. 4 the sheet metal is bent to form sharper angles than in either Fig. 1 or Fig. 2, while in Fig. 5 the sheet metal is bent to form an ogee curve or double curve, one edge being bent down and the other up. I do not wish to confine myself to these specific forms, as they may be varied without changing or materially altering the utility of the rule.

Having thus described my invention, I claim as new and desire to secure by Letters Patent—

As a new article of manufacture, a sheet-metal ruler having near one edge a longitudinal bend or corrugation, $a'$, and at an equal distance from its other edge a similar but opposite bend, $c'$, substantially as described.

CHARLES A. SMITH.

Witnesses:
M. E. EMERSON,
H. J. MILLER.